United States Patent
Hwang

(10) Patent No.: US 6,605,930 B2
(45) Date of Patent: Aug. 12, 2003

(54) LOW POWER MODE AND FEEDBACK ARRANGEMENT FOR A SWITCHING POWER CONVERTER

(75) Inventor: Jeffrey H. Hwang, Saratoga, CA (US)

(73) Assignee: Champion Microelectronic Corp., Hsinchu (TW)

( * ) Notice: Subject to any disclaimer, the term of this patent is extended or adjusted under 35 U.S.C. 154(b) by 25 days.

(21) Appl. No.: 10/043,638

(22) Filed: Jan. 9, 2002

(65) Prior Publication Data

US 2002/0057077 A1 May 16, 2002

Related U.S. Application Data

(62) Division of application No. 09/502,719, filed on Feb. 11, 2000, now Pat. No. 6,452,366.

(51) Int. Cl.[7] .............................................. G05F 1/613
(52) U.S. Cl. ................................ 323/225; 323/284
(58) Field of Search ................................ 323/222, 225, 323/271, 282, 283, 284, 285, 223, 224

(56) References Cited

U.S. PATENT DOCUMENTS

| | | | |
|---|---|---|---|
| 5,396,165 A | 3/1995 | Hwang et al. | 323/210 |
| 5,565,761 A | 10/1996 | Hwang | 323/222 |
| 5,592,128 A | 1/1997 | Hwang | 331/61 |
| 5,742,151 A | 4/1998 | Hwang | 323/222 |
| 5,747,977 A | 5/1998 | Hwang | 323/284 |
| 5,798,635 A | 8/1998 | Hwang et al. | 323/222 |
| 5,804,950 A | 9/1998 | Hwang et al. | 323/222 |
| 5,818,207 A | 10/1998 | Hwang | 323/288 |
| 5,831,418 A | 11/1998 | Kitagawa | 323/222 |
| 5,894,243 A | 4/1999 | Hwang | 327/540 |
| 5,903,138 A | 5/1999 | Hwang et al. | 323/266 |
| 5,912,552 A | 6/1999 | Tateishi | 323/285 |
| 6,060,867 A | 5/2000 | Farrington et al. | 323/222 |
| 6,091,233 A | 7/2000 | Hwang et al. | 323/222 |
| 6,140,808 A | 10/2000 | Massie | 323/284 |
| 6,452,366 B1 * | 9/2002 | Hwang | 323/225 |

* cited by examiner

Primary Examiner—Jessica Han
(74) Attorney, Agent, or Firm—Derek J. Westberg

(57) ABSTRACT

A low power mode and feedback arrangement for a switching power converter. Two or more main power switches, such as transistors, transfer energy from a supply to load by their opening and closing. When the load requires a relatively low power level, this condition is detected. In response, one or more of the transistor switches is disabled from switching and the reduced power requirements of the load are handled by the remaining one or more transistor switches. As a result, switching losses are reduced. This is because parasitic gate capacitance and on-resistance associated with the disabled switches no longer consume power from the power source. The invention provides significant efficiency advantages during periods when the load draws a low level of power. This is especially useful for battery-powered devices which may operate in a low power mode for extended periods of time, such as standby mode as in a portable telephone. This is because the prevention of power loss in may contribute considerably to operating time before battery re-charging is needed. However, when additional power is required, one or more previously disabled switches may be brought back into play to ensure that the power requirements of the load are met. In an audio amplifier having a H-bridge arrangement for providing a differential output signal, the invention also provides a feedback path from only one side of the load. This reduces distortion associated with open-ended operation.

16 Claims, 10 Drawing Sheets

LOW POWER MODE AND FEEDBACK ARRANGEMENT FOR A SWITCHING POWER CONVERTER

This is a division of application Ser. No. 09/502,719, filed Feb. 11, 2000 now U.S. Pat. No. 6,452,366.

BACKGROUND OF THE INVENTION

The invention relates to the field of switching power converters and amplifiers. More particularly, the invention relates to switching power converters and amplifiers having a low power mode for conserving power.

In a conventional switching-mode power converter, a current from a power source, such as an unregulated supply, passes through an inductor when a main power switch is closed. This charges the inductor with energy. When the switch is opened, the energy is discharged into a capacitor. This forms an output voltage across the capacitor which may then be used for driving a load. This output voltage is maintained at a constant, desired level by appropriately controlling the opening and closing of the switch, such as by pulse-width modulation (PWM) or frequency modulation.

In accordance with PWM, the duty-cycle for opening and closing the main power switch is controlled. For example, a periodic ramp signal is compared to a variable signal to control the duty cycle of the switch. A level of power delivered to the load depends upon a duty cycle of the main power switch.

In accordance with frequency modulation, the frequency at which the main power switch is opened and closed is controlled. For example, a voltage-controlled oscillator (VCO) can be utilized for controlling the main power switch. A level of power delivered to the load depends upon the switching frequency.

A conventional switching power amplifier is a type of switching power converter in which the output is varied in response to an input signal. This is in contrast to a switching power converter in which the output is typically maintained at a constant level. In a typical switching power amplifier, the opening and closing of the main power switch is controlled in response to a level of the input signal. Therefore, the output of the switching amplifier tends to follow the input signal.

A class D audio amplifier is an example of a conventional type of switching power amplifier which provides a differential output signal across a speaker using an H-bridge arrangement of four main power switches. Each pair of the switches is coupled serially between a high potential of a power supply and a low potential. Nodes intermediate to each pair of power switches are connected to opposite terminals of the speaker. By controlling the opening and closing of the four main power switches in accordance with an input audio signal, the audio speaker generates sounds related to the input signal. Because the output signal is differential, such an amplifier is typically operated in open loop (i.e. without feedback). A drawback to open loop operation of such an amplifier is that the output signal is susceptible to distortion.

Conventional switching power converters tend to provide efficiency advantages over other types of devices. This is because switching power converters tend to draw power at a rate commensurate with the requirements of the load and tend to have relatively low energy losses. Energy loss in a switching power converter is typically referred to a switching loss and is largely due to energy dissipation in the main power switch(es) and in the reactive elements, such as inductors or capacitors. When a load consumes a level of power which is near the maximum capacity of the switching power converter, the switching losses are low in comparison to the total power drawn by the switching power converter. Thus, the converter operates with high efficiency. As the level of power consumed by the load decreases, however, switching losses become more significant in comparison to the level of power drawn from the power supply. Thus, at low levels of load power consumption, switching losses can significantly reduce efficiency. Efficiency, however, is often an important performance criteria for a switching power converter. For example, where the power is drawn from a battery supply, such as in a portable telephone, low efficiency results in reduced periods of operation between battery charges. Therefore, conventional switching power converters tend make inefficient use of battery power when a load draws a low level of power.

Therefore, what is needed is a switching power converter which does not suffer from the aforementioned drawbacks. It is to these ends that the present invention is directed.

SUMMARY OF THE INVENTION

The present invention is a low power mode and feedback arrangement for a switching power converter. Two or more main power switches, such as transistors, transfer energy from a supply to a load by their opening and closing. When the load requires a relatively low power level, this condition is detected. In response, one or more of the transistor switches is disabled from switching and the reduced power requirements of the load are handled by the remaining one or more transistor switches. As a result, switching losses are reduced. This is because parasitic gate capacitance and on-resistance associated with the disabled switches no longer consume power from the power source. The invention provides significant efficiency advantages during periods when the load draws a low level of power. This is especially useful for battery-powered devices which may operate in a low power mode for extended periods of time, such as standby mode as in a portable telephone. The prevention of power loss may contribute considerably to operating time before battery re-charging is needed. However, when additional power is required, one or more previously disabled switches may be brought back into operation to ensure that the power requirements of the load are met.

In an audio amplifier having a H-bridge arrangement for providing a differential output signal, the invention also provides a feedback path from only one side of the load. This reduces distortion associated with open-ended operation.

In accordance with one aspect of the present invention, a switching power converter is provided having first and second transistor switches. Energy is transferred from a supply to a load by opening and closing the first transistor switch; energy is transferred from the supply to the load by opening and closing the second transistor switch; and the second transistor is disabled from switching upon detection of a low power condition.

The first switch may transfer energy from the supply to a first reactive element upon closing and the first switch may transfer energy from the first reactive element to a second reactive element upon opening. The second transistor switch may transfer energy from the supply to a third reactive element upon closing and the second transistor switch may transfer energy from the third reactive element to the second reactive element upon opening. Switching of the first and second transistor switches may be interleaved. The first and second transistor switches may be coupled in parallel to each other. Switching of the first transistor switch may be synchronized with switching of the second transistor switch when the second transistor switch is actively switching. The first transistor switch may be disabled from switching when the second transistor switch is actively switching. The switching power converter may include a pulse-width modulation switch controller coupled to the first and second switches. The switching power converter may include a frequency modulation switch controller coupled to the first and second switches. The low power detector may detect the low power condition by monitoring a voltage provided to the load or by monitoring an error signal representative of a difference between a voltage provided to the load and a desired level for the voltage. The low power detector may include a comparator having a hysteretic transfer characteristic. The first and second transistor switches may have substantially different current-carrying capacities. Energy may be transferred to the load by a current which is synchronously rectified. The switching power converter may also include a third transistor switch and a fourth transistor switch, the third and fourth transistor switches for performing synchronous rectification on the current, wherein the fourth transistor is disabled by the low power detector upon detection of the low power condition.

In accordance with a further aspect of the invention, a switching power converter is provided which includes a switch controller and a plurality of transistor switches including a first transistor switch and a group of at least two additional transistor switches. Each transistor switch is coupled to the switch controller for transferring power from a supply to a load by the switch controller opening and closing the corresponding transistor switch. A low power detector is coupled to the group of at least two additional transistor switches for selectively disabling switching of one or more of the transistor switches of the group in accordance with a detected level of power provided to the load.

The plurality of transistor switches may be coupled in parallel to each other. The transistor switches of the plurality that are actively switching may be synchronized. The switch controller may be a pulse-width modulation switch controller. The switch controller may be a frequency modulation switch controller. The low power detector may detect the level of power provided to the load by monitoring a voltage provided to the load or by monitoring an error signal representative of a difference between a voltage provided to the load and a desired level for the voltage. The low power detector may include a comparator having a hysteretic transfer characteristic.

In accordance with another aspect of the invention, a switching amplifier is provided for receiving an input signal and for generating and output signal representative of the input signal. A first pair of transistor switches alternately raises and lowers a voltage potential of a first terminal of a reactive element upon switching of the first pair of transistor switches; a second pair of transistor switches alternately raises and lowers a voltage potential of the first terminal of the reactive element upon switching of the second pair of transistor switches; a switch controller controls switching of the first and second pairs of transistor switches in accordance with the input signal for forming the output signal at a second terminal of the reactive element. A low signal level detector is coupled to the second pair of transistor switches for disabling the second pair of transistor switches from switching upon detection of a low input signal level condition.

The input signal may be an audio signal. The switching amplifier may include a speaker coupled to receive output signal. The switching amplifier may include one or more additional pairs of transistor switches for alternately raising and lowering a voltage potential of the first terminal of the reactive element, each additional pair being selectively disabled by the low signal level detector upon detection of a corresponding low signal level condition (FIG. 9B). The transistor switches of the first pair may have substantially equal current carrying capacities which are substantially different from current carrying capacities of the transistor switches of the second pair. The low signal level detector may detect the low power condition by monitoring the input signal or by monitoring an error signal representative of a difference between the input signal and a reference level. The low power detector may include a window comparator. The window comparator may have a hysteretic transfer characteristic. The switching amplifier may include a feedback path from a terminal of the reactive element to the switch controller for limiting the output signal. The first pair of transistor switches may be actively switching when the low signal level condition is not detected. The first pair of transistor switches may be disabled by the low signal level detector when the low signal level condition is not detected.

In accordance with yet another aspect of the invention, a switching amplifier is provided for receiving an input signal and for generating a differential output signal representative of the input signal. A first pair of transistor switches alternately raises and lowers a voltage potential of a first terminal of a first reactive element upon switching of the first pair of transistor switches; a second pair of transistor switches alternately raises and lowers a voltage potential of the first terminal of the first reactive element upon switching of the second pair of transistor switches; a third pair of transistor switches alternately raises and lowers a voltage potential of a first terminal of a second reactive element upon switching of the third pair of transistor switches; and a fourth pair of transistor switches alternately raises and lowers a voltage potential of the first terminal of the second reactive element upon switching of the fourth pair of transistor switches. A switch controller controls switching of the first, second, third and fourth pairs of transistor switches in accordance with the input signal for forming a differential output signal across a second terminal of the first reactive element and a second terminal of the second reactive element. A low signal level detector is coupled to the second and fourth pair of transistor switches for disabling the second and fourth pair of transistor switches from switching upon detection of a low input signal level condition.

The input signal may be an audio signal. The switching amplifier may include a speaker coupled to receive the differential output signal. The switching amplifier may include one or more additional pairs of transistor switches for alternately raising and lowering a voltage potential of the first terminal of the reactive element, and one or more additional pairs of transistor switches for alternately raising and lowering a voltage potential of the first terminal of the second reactive element, each additional pair being selectively disabled by the low signal level detector upon detection of a corresponding low signal level condition. The transistor switches of the first pair may have substantially equal current carrying capacities which are substantially different from current carrying capacities of the transistor switches of the second pair. The low signal level detector may be detected the low signal level condition by monitoring the input signal or by monitoring an error signal representative of a difference between the input signal and a reference level. The low power detector may include a window comparator. The window comparator may have a hysteretic transfer characteristic. The switching amplifier may include a feedback path from a terminal of the first reactive element to the switch controller for limiting the differential output signal. A corresponding feedback path from the second reactive element to the switch controller may not be present. The first and third pairs of transistor switches may be actively switching when the low input signal level condition is not detected. The first and third pairs of transistor switches may be disabled by the low signal level detector when the low input signal level condition is not detected. The switching amplifier may be implemented in an eight pin integrated circuit package.

In accordance with a further aspect of the present invention, a switching amplifier is provided for receiving an input signal and for generating a differential output signal representative of the input signal. A first pair of transistor switches alternately raises and lowers a voltage potential of a first terminal of a first reactive element upon switching of the first pair of transistor switches; a second pair of transistor switches alternately raises and lowers a voltage potential of a first terminal of a second reactive element upon switching of the second pair of transistor switches; and a switch controller controls switching of the first and second pairs of transistor switches in accordance with the input signal for forming a differential output signal across a second terminal of the first reactive element and a second terminal of the second reactive element. A feedback path is provided from a terminal of the first reactive element to the switch controller for limiting the differential output signal. A corresponding feedback path from the second reactive element to the switch controller may not be present.

DETAILED DESCRIPTION OF A PREFERRED EMBODIMENT

Figure 1:
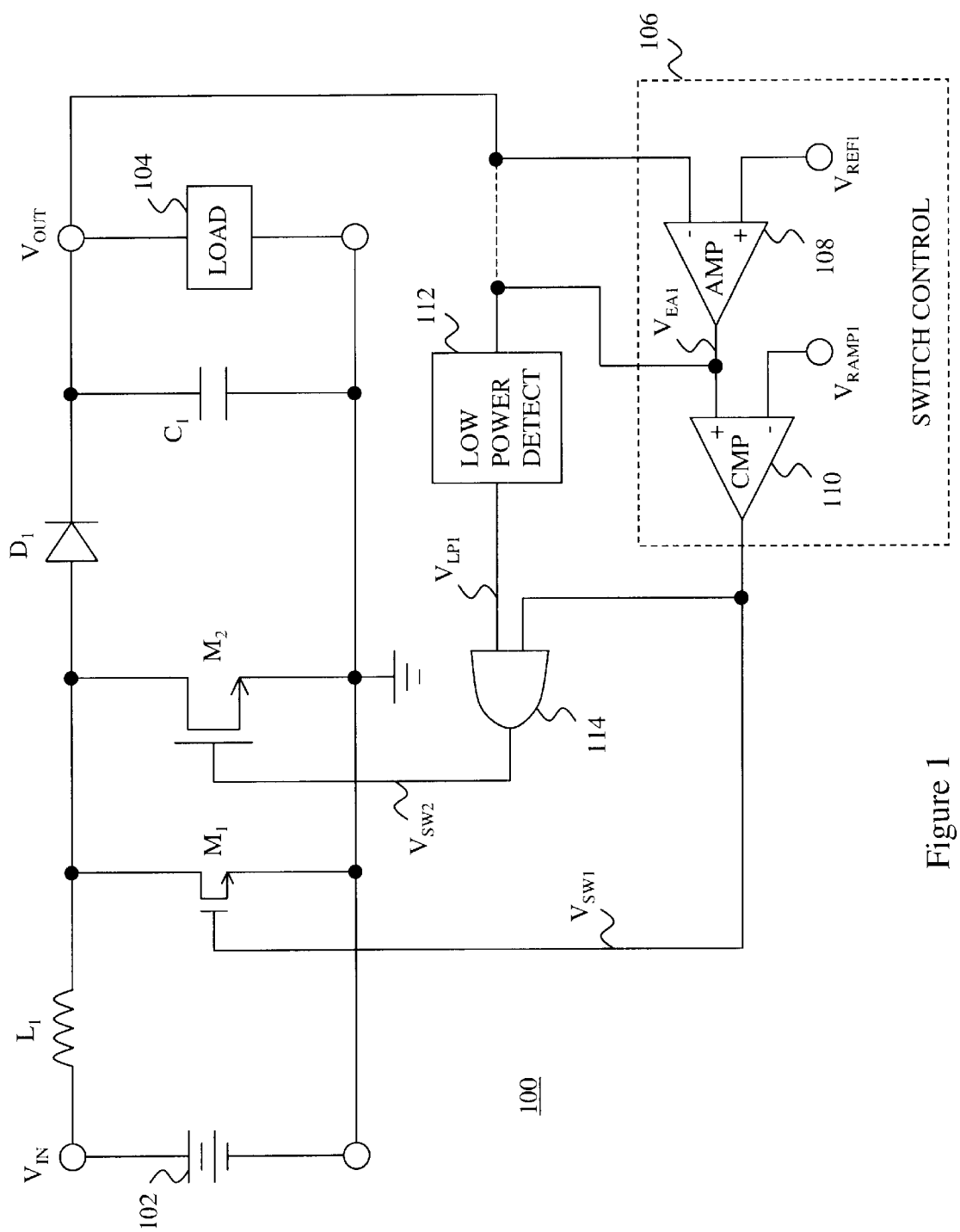
FIG. 1 illustrates a schematic diagram of a switching power converter having a low power mode in accordance with the present invention.

FIG. 1 illustrates a schematic diagram of a switching power converter 100 having a low power mode in accordance with the present invention. The power converter 100 is coupled to receive power from a power supply 102. The supply 102 may be, for example, an unregulated direct-current (DC) supply, such as a battery or a rectified alternating current (AC) signal. The supply 102 forms a voltage $V_{IN}$ which may be coupled to a first terminal of a reactive element, such as an inductor $L_1$. A second terminal of the inductor $L_1$ may be coupled to a drain terminal of an n-type field-effect transistor $M_1$, to a drain terminal of an n-type field-effect transistor $M_2$ and to an anode of a diode $D_1$. A cathode of the diode $D_1$ may be coupled to a first terminal of a reactive element, such as a capacitor $C_1$, and to a first terminal of a load 104. Source terminals of the transistors $M_1$ and $M_2$, a second terminal of the capacitor $C_1$ and a second terminal of the load 104 may be coupled to a ground mode. Because the drain and source terminals of the transistors $M_1$ and $M_2$ are coupled together, the transistors $M_1$ and $M_2$ may be said to be coupled in parallel.

The transistors $M_1$ and $M_2$ may function as switches. Activating (closing) one or both of the transistor switches $M_1$ and $M_2$ by turning the transistors $M_1$ and $M_2$ on results in a current which passes through the inductor $L_1$. This transfers energy from the supply 102 to an electromagnetic field associated with the inductor $L_1$. When the transistors $M_1$ and $M_2$ are deactivated (opened) by turning the transistors $M_1$ and $M_2$ off, energy stored by the inductor $L_1$ is transferred to the capacitor $C_1$. By repeatedly opening and closing one or both of the transistor switches $M_1$ and $M_2$, an output voltage $V_{OUT}$ is built up across the capacitor $C_1$. The output voltage $V_{OUT}$ is available for providing power to the load 104.

A switch controller 106 may control the transistor switches $M_1$ and $M_2$ based upon a level of the output voltage $V_{OUT}$. The switch controller 106 may include an amplifier 108 and a comparator 110. An inverting input of the amplifier 108 may be coupled to receive the output voltage $V_{OUT}$. A resistive voltage divider (not shown) may be coupled to the inverting input of the amplifier 108 for stepping down the output voltage $V_{OUT}$. A reference voltage $V_{REF1}$ may be coupled to a non-inverting input of the amplifier 108. The reference voltage $V_{REF1}$ corresponds to a desired level for the output voltage $V_{OUT}$ Accordingly, the output of the amplifier 108 forms an error signal $V_{EA1}$ which is representative of a difference between the output voltage $V_{OUT}$ (or a portion of $V_{OUT}$ from the resistive voltage divider) and a desired level for the output voltage $V_{OUT}$. This error signal $V_{EA1}$ may be coupled to a non-inverting input of the comparator 110 while a periodic ramp signal $V_{RAMP1}$ may be coupled to an inverting input of the comparator 110. The output of the comparator 110 forms a switch control signal $V_{SW1}$ which may be coupled to the gate of the transistor switch $M_1$ for controlling the transistor switch $M_1$.

Figure 2:
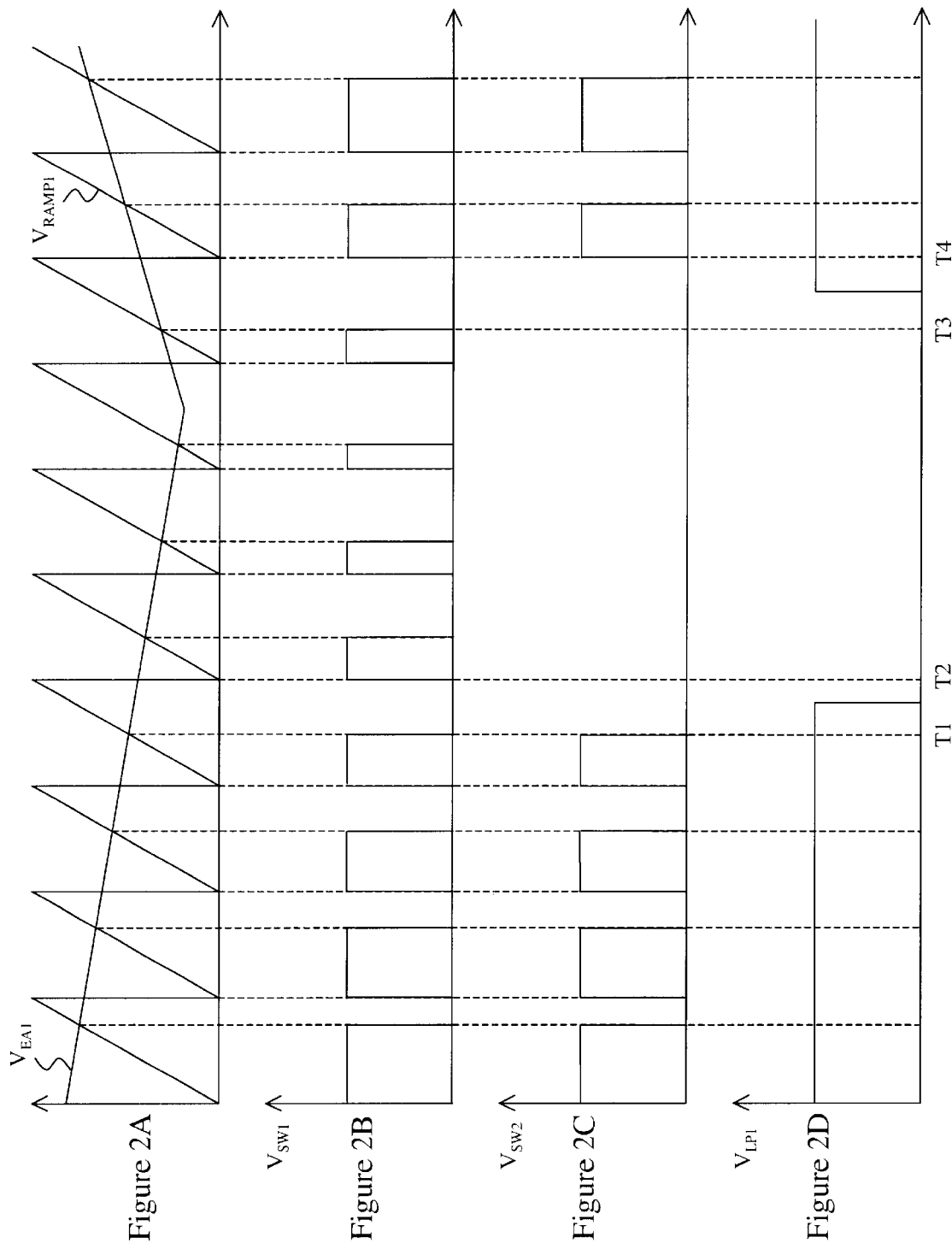
FIGS. 2A–C illustrate timing diagrams for selected signals of the power converter illustrated in FIG. 1.

FIG. 2A illustrates a timing diagram for the signals $V_{EA1}$ and $V_{RAMP1}$. As shown in FIG. 2A, the error signal $V_{EA1}$ varies in response to changes the output voltage $V_{OUT}$. While the output voltage $V_{OUT}$ is regulated to a desired level, it may undergo transient variations. For example, the output voltage $V_{OUT}$ may vary in response to changes in a level of current drawn by the load 104. As is also shown in FIG. 2A, the ramp signal $V_{RAMP1}$ has a approximately constant slope over each of it periods. The ramp signal $V_{RAMP1}$ is reset to an initial value at the end of each period. The ramp signal $V_{RAMP1}$ may be generated by conventional circuitry.

FIG. 2B illustrates a timing diagram for the switch control signal $V_{SW1}$. Note that FIG. 2B is drawn with a time scale along the horizontal axis which is equivalent to that of FIG. 2A. As shown in FIG. 2B, the switch control signal $V_{SW1}$ may be a logical high voltage, causing the transistor switch $M_1$ to close, at times when the ramp signal $V_{RAMP}$ is lower than the error signal $V_{EA1}$. As is also shown in FIG. 2B, the signal $V_{SW1}$ may be a logical high voltage, causing the transistor switch $M_1$ to open, at times when the ramp signal $V_{RAMP}$ is higher than the error signal $V_{EA1}$. Accordingly, as shown in FIG. 2B, a duty-cycle for the transistor switch $M_1$ may vary with changes in the error signal $V_{EA1}$ so as to regulate $V_{OUT}$ at the desired level.

It will be apparent that the switch controller 106 of FIG. 1 is a conventional PWM switch controller. Because the closing of the transistor switch $M_1$ coincides with the resetting of the ramp signal $V_{RAMP1}$, the switch controller 106 may be considered to perform trailing edge modulation. It will be apparent that the switch controller 106 may be altered or replaced by another type of switch controller. For example, the switch controller 106 may be modified to perform leading edge modulation. This may be accomplished, for example, by reversing the polarities of the inputs to the amplifier 108 and the comparator 110. As another example, the switch controller 106 may be replaced by a frequency modulation switch controller.

Referring FIG. 1, a low power detector 112 may also be coupled to monitor the error signal $V_{EA1}$. Alternately, the low power detector 112 may be coupled to monitor the output voltage $V_{OUT}$. This is shown in FIG. 1 by a dotted line between the input of the amplifier 108 and the input of the low power detector 112. Assuming the detector 112 is coupled to the input of the amplifier 108, then the detector 112 need not be coupled to the output of the amplifier 108. An output of the low power detector 112 forms a signal $V_{LP1}$ which may be coupled to a first input of a logic AND gate 114. The switch control signal $V_{SW1}$ may be coupled to a second input of the logic AND gate 114. An output of the logic AND gate 114 forms a switch control signal $V_{SW2}$ which may be coupled to the gate of the transistor switch $M_2$ for controlling the transistor switch $M_2$. FIG. 2C illustrates a timing diagram for the switch control signal $V_{SW2}$, while FIG. 2D illustrates a timing diagram for the low power detection signal $V_{LP1}$ formed by the low power detector 112. Note that FIGS. 2C–D are drawn with a time scale which coincides with that of FIGS. 2A–B. When the signal $V_{LP1}$ is logic high voltage, the switch control signal $V_{SW1}$ is passed by the logic AND gate 114. Under such circumstances, the transistor switch $M_2$ may be synchronized with the transistor switch $M_1$ and may operate in accordance with the same duty cycle, as shown by comparing FIGS. 2B and 2C prior to a time $T_1$ and after a time $T_4$.

However, when the low power detector 112 detects that the load 104 draws a relatively light load, the low power detection signal $V_{LP1}$ may transition from a logic high voltage to a logic low voltage. This is shown occurring in FIG. 2D sometime after the time $T_1$ and before the time $T_2$. In response to this transition in the signal $V_{LP1}$, the logic AND gate 114 inhibits the switch control signal $V_{SW1}$ from passing to its output. Instead, the signal $V_{SW2}$ formed at the output of the logic AND gate 114 is held at a logic low voltage. This is shown in FIG. 2C at the time $T_2$ where the signal $V_{SW2}$ remains a logic low voltage, whereas, the signal $V_{SW1}$ transitions from a logic low voltage to a logic high voltage. Accordingly, the transistor switch $M_2$ is disabled upon detection of a low power condition. Assuming a low power condition is no longer detected, then the signal $V_{LP1}$ may transition back to a logical high voltage, as shown occurring in FIG. 2D after a time $T_3$ and before the time $T_4$. As a result, the transistor switch $M_2$ is enabled to resume switching in concert with the transistor switch $M_1$, as shown occurring in FIG. 2D at the time $T_4$.

This feature of the present invention may provide significant efficiency benefits when the power requirements of the load 104 change significantly over time. For example, the load 104 may be a battery-powered device, such as a portable telephone. When the telephone is in use, such as for making a telephone call, then its receiver and transmitter may both be active. Under these circumstances, both the transistor switches $M_1$ and $M_2$ may be actively switching to supply sufficient power to the telephone. When the call ends, the telephone may enter a standby mode in which the receiver is active, but the transmitter is inactive. As a result, less power is drawn by the telephone. This may cause the output voltage $V_{OUT}$ supplied to the telephone to increase somewhat and, thus, the level of error signal $V_{EA1}$ may fall. Note that when the load 104 draws a low level of power, the output voltage $V_{OUT}$ tends to rise due to opening and closing of the switches $M_1$ and $M_2$. This is because even at a minimum duty-cycle, switching may still occur. As a result, the low power detector 112 may detect that the telephone is in a low power mode and, in response, disables switching of the transistor switch $M_2$. Switching of the switch $M_1$ by itself, may then provide sufficient power for the portable telephone when it is in standby mode. When the portable telephone is again used for a telephone call, then its transmitter may be activated. This may cause the output voltage $V_{OUT}$ to fall somewhat and, thus, the error signal $V_{EA1}$ may rise. As a result, the low power detector 104 may detect that the telephone is in a high power mode and, in response, re-enables switching of the transistor switch $M_2$.

Switching losses in the transistor switches $M_1$ and $M_2$ are largely a result of parasitic capacitance at their gates. This parasitic gate capacitance is charged and then discharged each time the corresponding transistor is activated and then deactivated. The gate capacitance of a transistor is related to the size of the current-carrying channel of the transistor. For a small transistor which has a small current-carrying capacity, the gate capacitance tends to be relatively small. In contrast, for a large transistor which has a large current-carrying capacity, the gate capacitance tends to be relatively large. Because the transistor switch $M_2$ is disabled during periods of low power consumption, switching losses associated with the switch $M_2$ are essentially eliminated during such periods. While switching losses are associated with the transistor $M_1$ during low power mode operation, these switching losses may less than would be the case for a single transistor which had current capacity for worst-case power requirements of the load 104. In accordance with the present invention, the transistor switch $M_2$ is brought into play only as necessary, such as when needed to satisfy the power requirements of the load 104.

In the preferred embodiment, the transistor switches $M_1$ and $M_2$ are sized so as to correspond with the various power requirements of the load 104. Considering the portable telephone example, power consumed in the standby mode can be expected to be less than approximately one-fourth of the power consumed when the telephone is being used during a telephone call. Accordingly, the transistor $M_1$ may have a substantially smaller current carrying capacity than the transistor $M_2$. For other loads, the proportions of power consumed in different operating modes may differ. For example, assume a load operates one of two modes where the power consumed in a first mode is approximately eighty percent of the power consumed in a second mode. For such a load, the transistor $M_1$ may have a substantially greater current carrying capacity than the transistor $M_2$. For other loads, the transistors $M_1$ and $M_2$ may have substantially equal current-carrying capacities. In addition to loads which draw power at relatively discrete levels, the invention may also provide efficiency advantages for loads which draw continuously varying levels of power.

Further, in addition to providing a single transistor which may be selectively disabled, such as the transistor $M_2$ (FIG. 1), it will be apparent that one or more transistors may be provided, one or more of which may be selectively disabled depending upon the level of power consumed by the load. For example, for a load which operates primarily in three distinct modes, each having a corresponding level of power consumption, a power converter may be provided for powering the load with three transistors switches having appropriate current-carrying capacity, one or two of which are selectively disabled depending upon the level of power consumed by the load. The low power detector 112 may then provide multiple outputs to specify one of a plurality of such low power modes. It will be apparent also that by appropriately modifying the logic circuitry of FIG. 1, the transistor $M_1$ may be disabled from switching when the transistor $M_2$ is actively switching.

Figure 3:
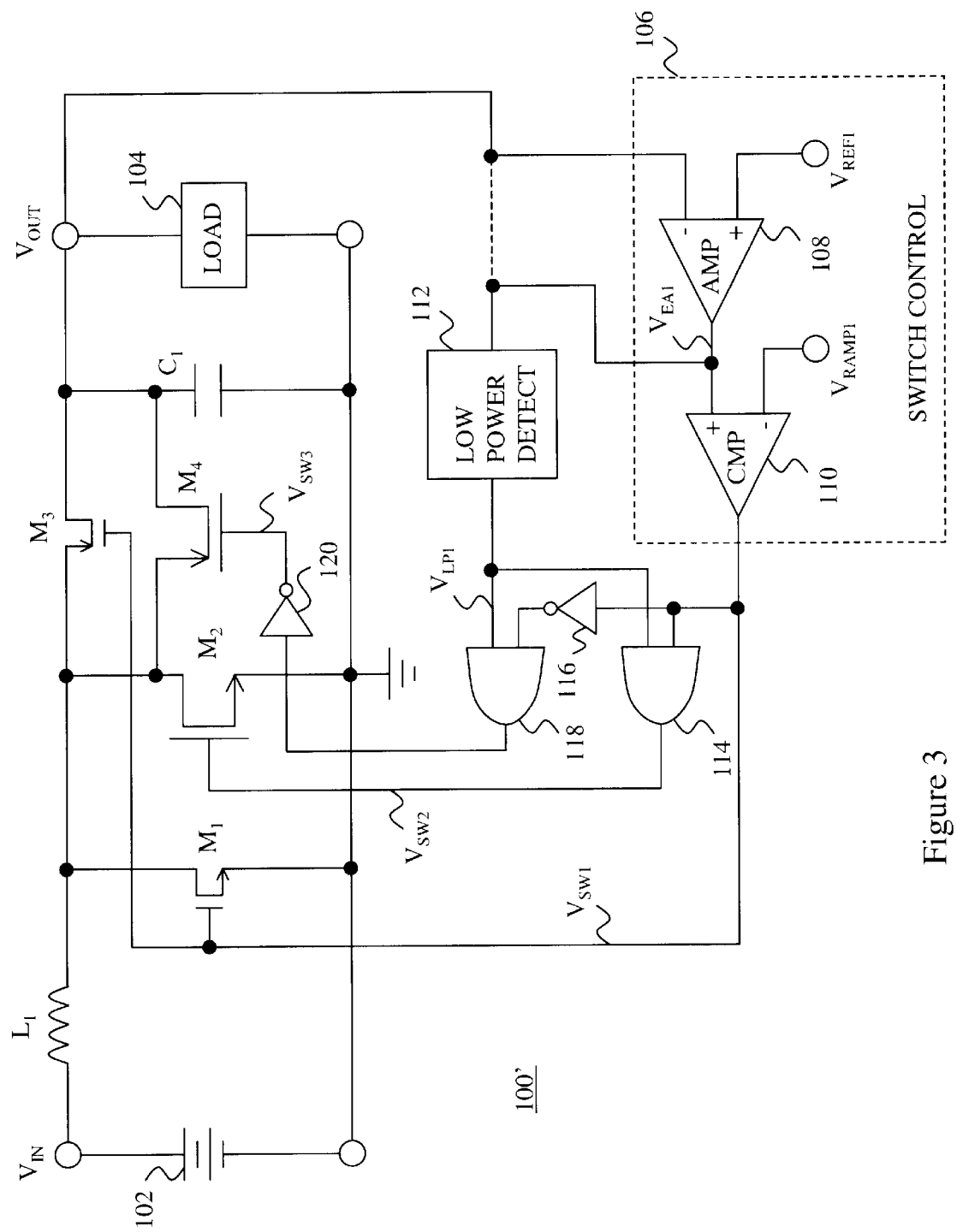
FIG. 3 illustrates a first alternate embodiment of the power converter of FIG. 1 in which synchronous rectification is performed.

The diode $D_1$ of FIG. 1 performs signal rectification such that current flows from the inductor $L_1$ for charging the capacitor $C_1$, however, current is prevented by the diode $D_1$ from discharging the capacitor C through the transistor switches $M_1$ and $M_2$. FIG. 3 illustrates an alternate embodiment of the power converter 100 of FIG. 1 in which synchronous rectification is performed. More particularly, the diode $D_1$ of FIG. 1 is replaced by n-type transistors $M_3$ and $M_4$. The transistor $M_3$ receives the switch control signal $V_{SW1}$, while the transistor $M_4$ receives a switch control signal $V_{SW3}$. The switch control signal $V_{SW1}$ is coupled to a first input of an inverter 116. An output of the inverter 116 is coupled to a first input of a logic AND gate 118. A second input of the logic AND gate 118 is coupled to receive the signal $V_{LP1}$ from the low power detector 112. An output of the logic AND gate 118 is coupled to an input of an inverter 120. An output of the inverter 120 forms the switch control signal $V_{SW3}$ which is coupled to the gate of the transistor $M_4$.

Under normal operating conditions, the transistor switch $M_3$ is open when the transistor switch $M_1$ is closed and vice versa. Similarly, the transistor switch $M_4$ is open when the transistor switch $M_2$ is closed and vice versa. Accordingly, during normal operation, the transistor switches $M_3$ and $M_4$ operate synchronously with the transistor switches $M_1$ and $M_2$ to rectify the current flowing to the capacitor $C_1$ from the inductor $L_1$. It will be understood, that the controller 106' preferably includes make-before-break circuitry (not shown) which ensures that the transistors $M_1$ and $M_3$ are not both turned on at the same time. Similarly, the controller 106' preferably ensures that the transistor switches $M_2$ and $M_4$ are not both turned on at the same time.

In the low power mode, when the signal $V_{LP1}$ is logic low voltage, the transistor switches $M_2$ and $M_4$ are disabled from switching. Under such conditions, each transistor switch $M_2$ and $M_4$ is turned off.

The transistor switches $M_3$ and $M_4$ are preferably sized substantially the same as the corresponding transistor switches $M_1$ and $M_2$, respectively. Synchronous rectification may also be accomplished by omitting the transistor $M_2$ and sizing the transistor $M_1$ appropriately to carry all of the current from the inductor $L_1$ to the capacitor $C_1$.

Figure 4:
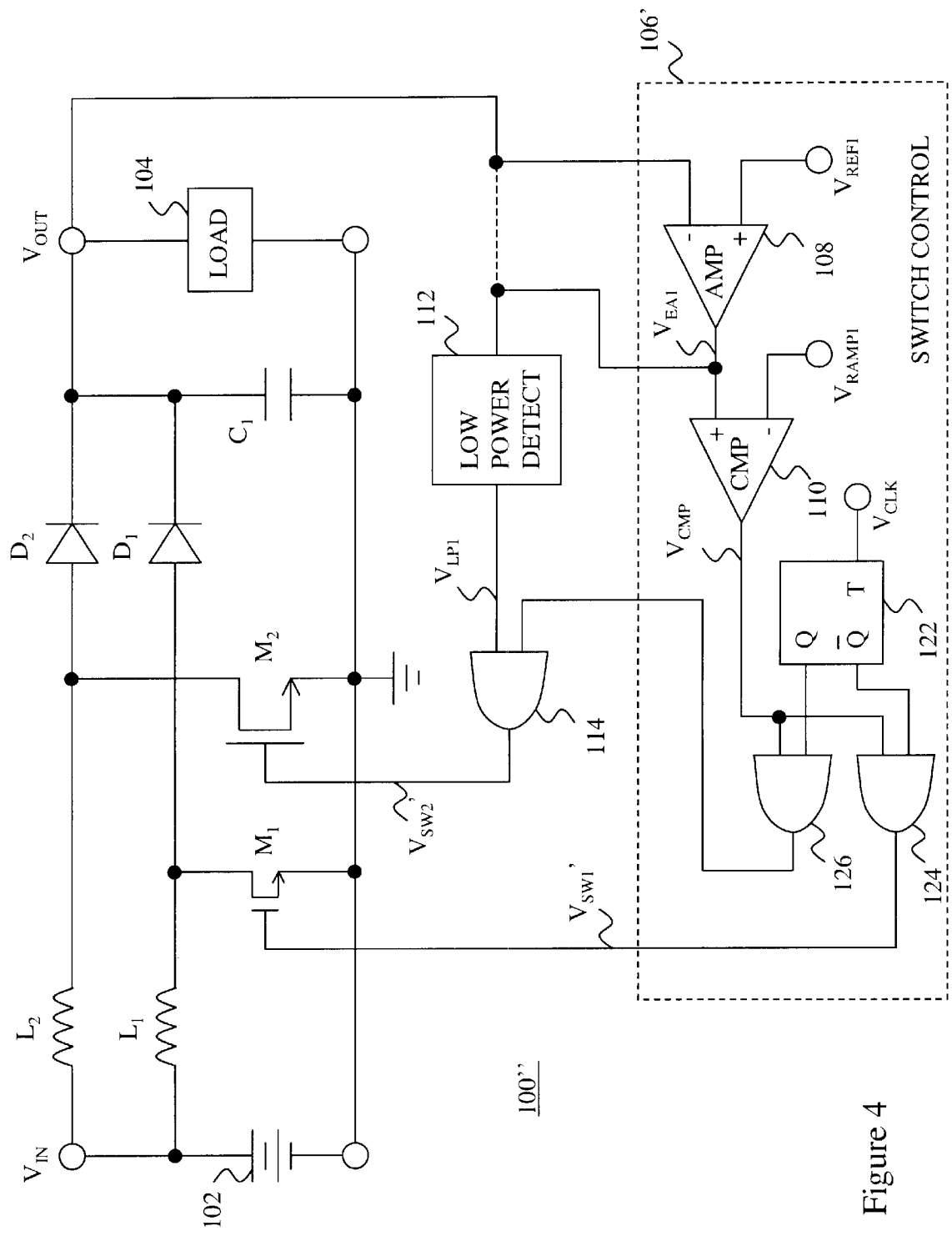
FIG. 4 illustrates a second alternate embodiment of the power converter of FIG. 1 in which parallel paths are provided for charging the output node.

FIG. 4 illustrates a second alternate embodiment of the power converter of FIG. 1 in which parallel paths are provided for delivering power to the load 104. The power converter 100' of FIG. 4 differs from that of FIG. 1 in that a second inductor $L_2$ provides a second path through which the capacitor $C_1$ may be charged from the input supply VIN. Current through the second inductor $L_2$ is controlled by the transistor switch $M_2$. Accordingly, the input supply VIN is coupled to a first terminal of the inductor $L_2$. A second terminal of the inductor $L_2$ is coupled to the drain of the transistor switch $M_2$ and to an anode of a diode $D_2$. A cathode of the diode $D_2$ is coupled the first terminal of the capacitor $C_1$.

Figure 5:
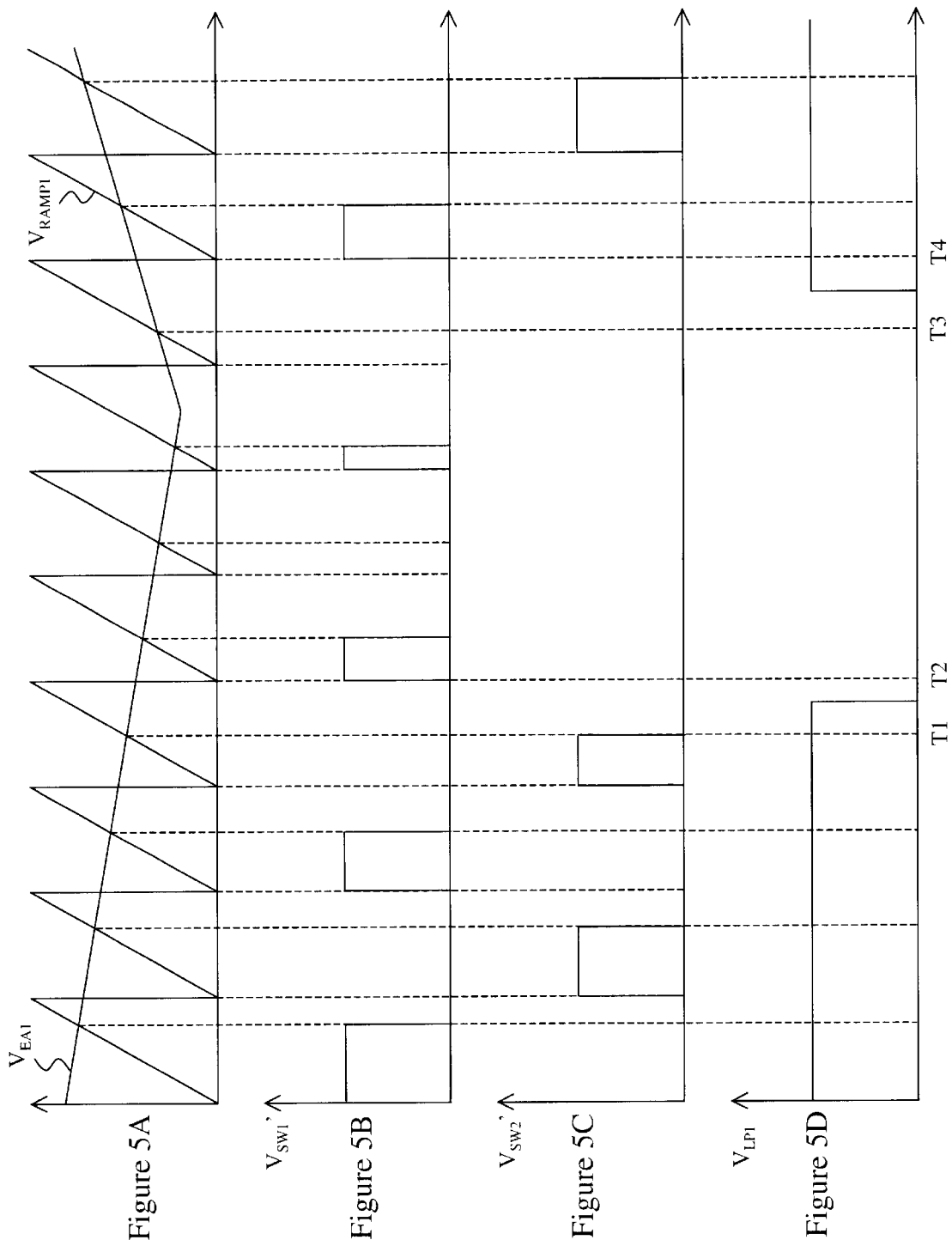
FIGS. 5A–C illustrate timing diagrams for selected signals of the power converter illustrated in FIG. 4.

Under normal operating conditions, the transistor switches $M_1$ and $M_2$ (FIG. 4) are both switching so that each provides a portion of the power delivered to the load 104. In the preferred embodiment, the transistor switches $M_1$ and $M_2$ are operated in an interleaved fashion. Thus, the switch $M_1$ is cycled from closed-to-open-to-closed while the switch $M_2$ remains closed. Similarly, the switch $M_2$ is cycled from closed-to-open-to-closed while the switch $M_1$ remains closed. FIGS. 5A–C illustrate timing diagrams for selected signals of the power converter illustrated in FIG. 4. The transistor switches $M_1$ and $M_2$ of FIG. 4 are controlled by switch control signals $V_{SW1}'$ and $V_{SW2}'$, respectively.

As can be seen from FIGS. 5A–5D, when the output $V_{LP1}$ of the low power detector 112 is a logic high voltage, the transistor switches $M_1$ and $M_2$ are both actively switching in an interleaved fashion. When the low power detector 112 detects a low power condition, however, the signal $V_{LP1}$ transitions to a logic low voltage. As shown in FIGS. 5C–5D, this disables the transistor switch $M_2$ from switching until the signal $V_{LP1}$ returns to a logic high voltage.

The switch controller 106' of FIG. 4 differs from that of FIG. 1 in that a flip-flop 122 and logic AND gates 124 and 126 provide the switch control signals $V_{SW1}'$ and $V_{SW2}'$. More particularly, a clock signal $V_{CLK}$ may be coupled to a toggle input of the flip-flop 122. Preferably, the flip-flop 122 is leading edge triggered while leading edges of the clock signal $V_{CLK}$ correspond with resetting of the ramp signal $V_{RAMP1}$, as shown in FIG. 5A. Thus, a Q output of the flip-flop 122 provides square wave signal of one-half the frequency of the clock signal $V_{CLK}$ and is coupled to a first input of the logic AND gate 126. An inverted output $\overline{Q}$ of the flip-flop 122 is coupled to a first input of the AND gate 124. A second input of each AND gate 124 and 126 is coupled to receive an output signal $V_{CMP}$ from the comparator 110. The logic AND gate 124 provides the switch control signal $V_{SW1}'$ for controlling the switch $M_1$. Similarly, the logic AND gate 126 provides the switch control signal $V_{SW2}'$ for controlling the switch $M_2$.

The inductors $L_1$ and $L_2$ may be of the same inductance value or may be of different values. In the preferred embodiment, the inductors $L_1$ and $L_2$ have inductance values which correspond to the sizes of the transistor switches $M_1$ and $M_2$ and to various levels of power expected to be drawn by the load 104. Further, one or both of the diodes $D_1$ and $D_2$ may be replaced by switches for performing synchronous rectification.

Figure 6:
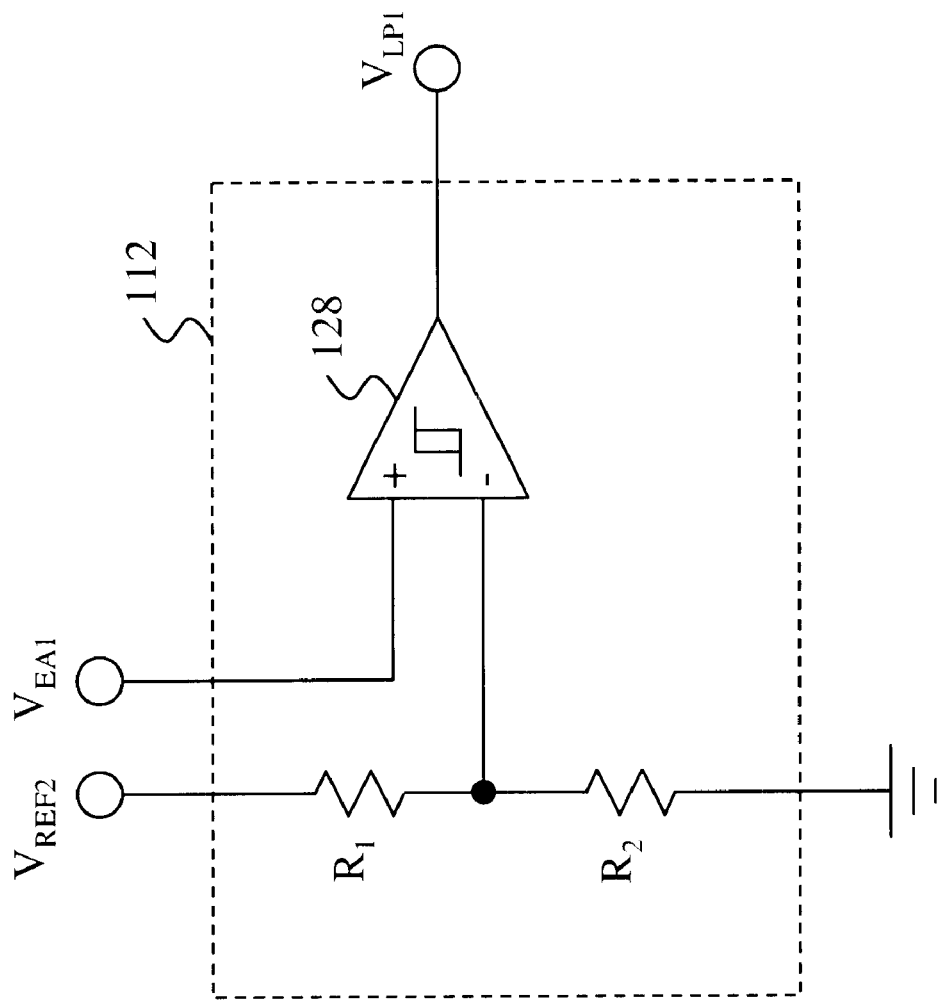
FIG. 6 illustrates a schematic diagram of a low power detection circuit for the power converter of FIG. 1.

FIG. 6 illustrates a schematic diagram of the low power detector 112 of FIG. 1. A reference voltage $V_{REF2}$ may be coupled to a first terminal of a resistor $R_1$. A second terminal of the resistor $R_1$ may be coupled to a first terminal of a resistor $R_2$ and to a first terminal of a comparator 128. A second terminal of the resistor $R_2$ may be coupled to the ground node. The resistors $R_1$ and $R_2$ form a resistive divider. Accordingly, a reference voltage $V_{REF3}$ formed at the first input of the comparator 128 is proportional to the reference voltage $V_{REF2}$. As mentioned, the low power detector 112 may be coupled to monitor either the output voltage $V_{OUT}$ or the error signal $V_{EA1}$ to determine whether a load coupled to the power converter 100 is in a low power mode. Assuming the error signal $V_{EA1}$ is monitored, it may be coupled to a second input of the comparator 128. An output of the comparator 128 forms the signal $V_{LP1}$.

As mentioned, under normal operating conditions, when both of the transistor switches $M_1$ and $M_2$ are operating, the signal $V_{LP1}$ is a logical high voltage. When the level of $V_{EA1}$ falls below the level of $V_{REF3}$, this indicates that the load 104 is in a low power mode. The comparator 128 responds by changing the signal $V_{LP1}$ from a logical high voltage to a logical low voltage. This disables switching of the transistor $M_2$. Preferably, the comparator 128 has a hysteretic transfer characteristic. This prevents the transistor $M_2$ from being disabled and enabled unnecessarily when the signal $V_{EA1}$ hovers about the level of the reference voltage $V_{REF3}$. Thus, the signal $V_{LP1}$ preferably does not return to a logic high voltage until the level of $V_{EA1}$ rises above the level of $V_{REF3}$ by a predetermined amount, as determined by the amount of hysteresis of the comparator 128.

Note that assuming more than two transistor switches are provided, the low power detector 112 may include an additional comparator for each additional transistor switch along with appropriate other logic circuitry. Each additional comparator may have a first input coupled to $V_{EA1}$ (or $V_{OUT}$), a second input coupled to an appropriate reference voltage level and an output coupled to enable/disable the corresponding transistor switch.

In sum, a switching power converter is disclosed which includes a plurality of main power switches, at least one of which may be disabled from switching while the others continue actively switching when a load powered by the converter draws a low level of power. Optionally, at least one transistor switch utilized for synchronous rectification may also be disabled in response to a low level of power. This feature is advantageous as it reduces switching losses and, thus, increases efficiency for periods of low power consumption by the load. Because the load may operate in a low power mode for an extended period of time, such as standby mode in a battery-powered telephone, the prevention of power loss may contribute considerably to operating time before the battery re-charging is needed.

Figure 7:
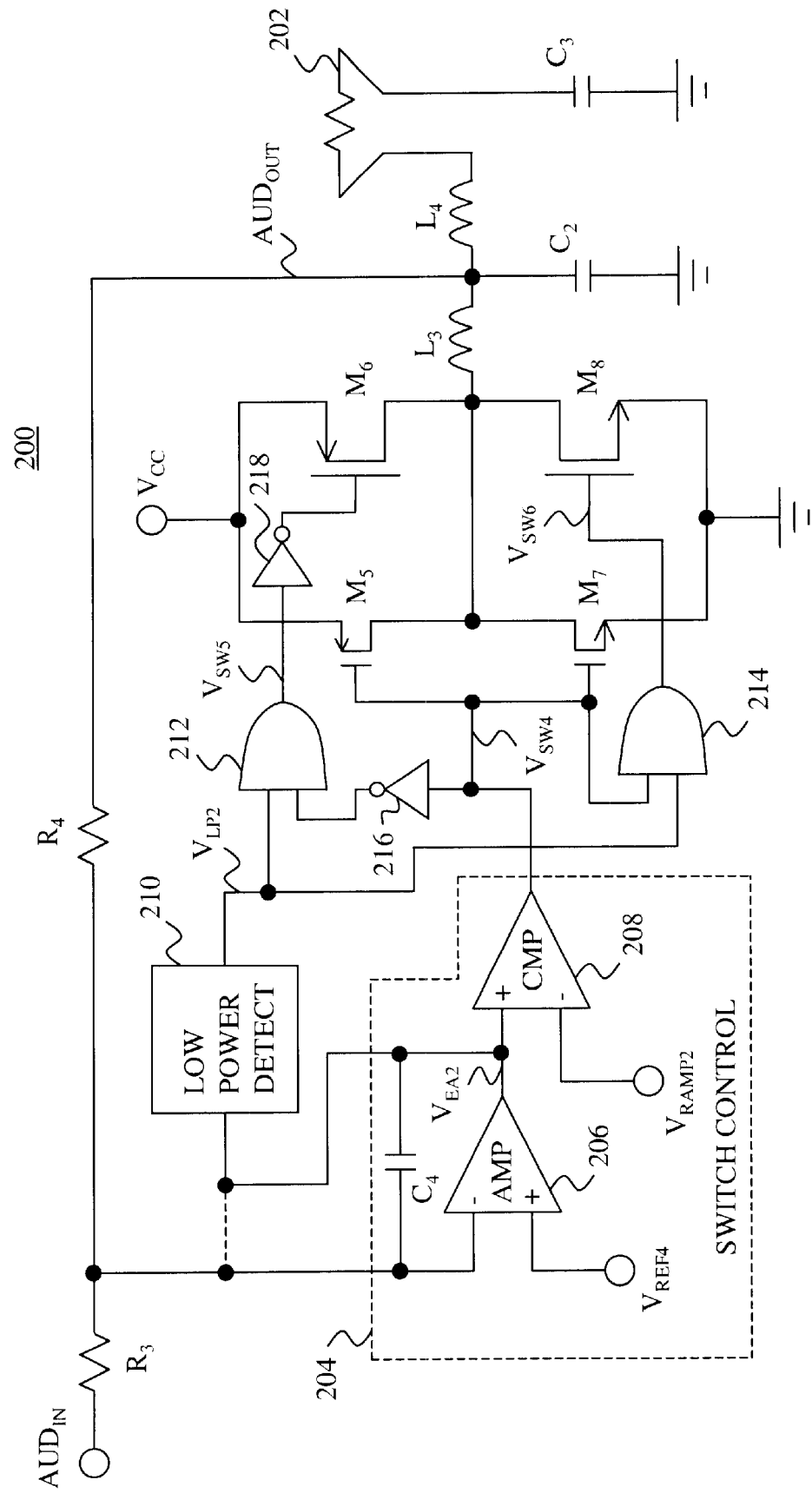
FIG. 7 illustrates a schematic diagram of a switching power amplifier having a low power mode and feedback arrangement.

FIG. 7 illustrates a schematic diagram of a switching power amplifier 200 having a low power mode and a feedback arrangement in accordance with the present invention. Referring to FIG. 7, a supply voltage $V_{CC}$ may be coupled to a source terminal of a p-type field-effect transistor $M_5$ and to a source terminal of an n-type field-effect transistor $M_6$. A drain terminal of the transistor $M_5$ may be coupled to a drain terminal of the transistor $M_6$, to a drain terminal of an n-type field-effect transistor $M_7$, to a drain terminal of an n-type field-effect transistor $M_8$ and to a first terminal of an inductor $L_3$. A second terminal of the inductor $L_3$ may be coupled to a first terminal of a capacitor $C_2$. A source terminal of the transistor $M_7$, a source terminal of the transistor $M_8$ and a second terminal of the capacitor $C_2$ may be coupled to a ground node.

The transistors $M_5$–$M_8$ may function as switches. Preferably, the pair of transistor switches $M_5$ and $M_7$ are operated such that when the transistor switch $M_5$ is activated (closed), the transistor switch $M_7$ is deactivated (opened); and when the transistor switch $M_5$ is deactivated (opened), the transistor switch $M_7$ is activated (closed). The pair of transistor switches $M_6$ and $M_8$ may be selectively disabled from switching. When disabled, the transistor switches $M_6$ and $M_8$ are both deactivated (opened). When actively switching, the transistor switches $M_6$ and $M_8$ are preferably operated such that the transistor switch $M_6$ is in the same condition (opened or closed) as the transistor switch $M_5$ and the transistor switch $M_8$ is in the same condition as the transistor switch $M_7$. Thus, when actively switching, the pair of transistor switches $M_6$ and $M_8$ are synchronized with the corresponding transistor of the pair $M_5$ and $M_7$.

Accordingly, when one or both of the transistor switches $M_5$ and $M_6$ is closed, the transistor switches $M_7$ and $M_8$ are open. Under these conditions, a voltage at the first terminal of the inductor $L_3$ is increased. As a result, a current from the supply voltage $V_{CC}$ tends to flow through the inductor $L_3$ to the capacitor $C_2$. This tends to increase a voltage across the capacitor $C_2$. When one or both of the transistor switches $M_7$ and $M_8$ is closed, the transistor switches $M_5$ and $M_6$ are open. Under these conditions, the voltage at the first terminal of the inductor $L_3$ is decreased. As a result, a current tends to be drawn from the capacitor $C_2$ and through the inductor $L_3$ to the ground node. This tends to reduce the voltage across the capacitor $C_2$. The inductor $L_3$ and the capacitor $C_2$ function as a smoothing filter such that a voltage formed across the capacitor $C_2$ is representative of an average of the voltage at the first terminal of the inductor $L_3$.

A speaker 202 may be coupled to receive an audio output signal $AUD_{OUT}$ formed across the capacitor $C_2$. More particularly, a first terminal of an inductor $L_4$ may be coupled to the first terminal of the capacitor $C_2$. A second terminal of the inductor $L_4$ may be coupled to a first terminal of the speaker 202. A second terminal of the speaker 202 may be coupled to a first terminal of a capacitor $C_3$. A second terminal of the capacitor $C_3$ may be coupled to the ground node. Alternately, the speaker 202 may be coupled to the capacitor $C_2$ via a transformer (not shown). In which case, a primary winding of the transformer may be coupled in series between the first terminal of the capacitor $C_2$ and the ground node, while the speaker may be coupled across a secondary winding of the transformer.

A switch controller 204 may be coupled to control the switches $M_5$–$M_8$ for powering a speaker 202 based upon an input audio signal $AUD_{IN}$. More particularly, the audio input signal AUDI may be coupled to a first terminal of a resistor $R_3$. A second terminal of the resistor $R_3$ may be coupled to the switch controller 204. The switch controller 204 may include an amplifier 206, a comparator 208 and a compensation capacitor $C_4$. An inverting input of the amplifier 206 may be coupled to the second terminal of the resistor $R_3$ and to a first terminal of the capacitor $C_4$. A reference voltage $V_{REF4}$ may be coupled to a non-inverting input of the amplifier 206. The reference voltage $V_{REF4}$ may be set to a desired quiescent level for the audio output signal $AUD_{OUT}$ (e.g., $V_{CC}/2$). Thus, the switch controller 204 receives the audio input signal $AUD_{IN}$ via the resistor $R_3$ and forms the error signal $V_{EA2}$ at the output of the amplifier 206. The error signal $V_{EA2}$ is representative of a deviation in the $AUD_{IN}$ signal from the reference voltage $V_{REF4}$.

The output of the amplifier 206 may be coupled to a second terminal of the capacitor $C_4$ and to a non-inverting input of the comparator 208. An inverting input of the comparator 208 may be coupled to receive a periodic ramp signal $V_{RAMP2}$, similar to the ramp signal $V_{RAMP1}$ (FIG. 2A). The error signal $V_{EA2}$ is then compared by the comparator 208 to the ramp signal $V_{RAMP2}$. An output of the comparator 208 forms a switch control signal $V_{SW4}$ which may be coupled to a gate of the transistor switches $M_3$ and $M_7$ for controlling the transistor switches $M_5$ and $M_7$.

Accordingly, the switch control signal $V_{SW4}$, formed by the comparator 208, is pulse-width modulated in accordance with the audio input signal $AUD_{IN}$ so as to control the transistors $M_5$ and $M_7$ to form the audio output signal $AUD_{OUT}$ at the first terminal of the capacitor $C_2$. A resistor $R_4$ may be coupled to provide negative feedback, such as from the second terminal of the inductor $L_2$ to the second terminal of the resistor $R_3$.

A low power detector 210 may be coupled to monitor the error signal $V_{EA2}$. Alternately, the low power detector 210 may be coupled to monitor the audio input signal $AUD_{IN}$, as shown by the dotted line between the second terminal of the resistor $R_3$ and the input of the detector 212. An output $V_{LP2}$ of the low power detector 210 may be coupled to a first input terminal of a logic AND gate 212 and to a first input terminal of a logic AND gate 214. The switch control signal $V_{SW4}$ may be coupled to a second input of the logic AND gate 214 and to a second input of the logic AND gate 212 via an inverter 216. An output of the logic AND gate 212 forms a switch control signal $V_{SW5}$ which may be coupled to the gate of the transistor switch $M_6$ via an inverter 218. An output of the logic AND gate 214 forms a switch control signal $V_{SW6}$ which may be coupled to the gate of the transistor switch $M_8$.

Thus, when the low power detection signal $V_{LP2}$ is a logical high voltage, the switch control signal $V_{SW4}$ is passed by the logic AND gate 214 to form the switch control signal $V_{SW6}$ and the switch control signal $V_{SW4}$, as inverted by the inverter 216, is passed by the logic AND gate 212 to form the switch control signal $V_{SW5}$. Under such conditions, the transistor switches $M_6$ and $M_8$ may actively switch in synchronism with the switches $M_5$ and $M_7$, respectively. However, when the input signal $AUD_{IN}$ is relatively low in amplitude, this means that the speaker 202 requires less power than when the signal $AUD_{IN}$ is of relatively high amplitude. Accordingly, the low power detector 210 detects this condition by monitoring the error signal $V_{EA2}$ (or the input signal $AUD_{IN}$). In response, the output $V_{LP2}$ of the low power detector 210 may transition from a logic high level to a logic low level. When the signal $V_{LP2}$ is a logic low voltage, the switch control signals $V_{SW5}$ and $V_{SW6}$ are held to a logic low level by the AND gates 212 and 214, respectively. Under these conditions, the transistor switches $M_6$ and $M_8$ are disabled from switching.

In summary, under low audio input signal $AUD_{IN}$ levels, such a low volume setting, less power is required to drive the speaker 202 than would be required otherwise. Accordingly, to save power, the transistors $M_6$ and $M_8$ are disabled from switching. This feature provides efficiency benefits by avoiding switching losses caused by the transistor switches $M_6$ and $M_8$.

Figure 8:
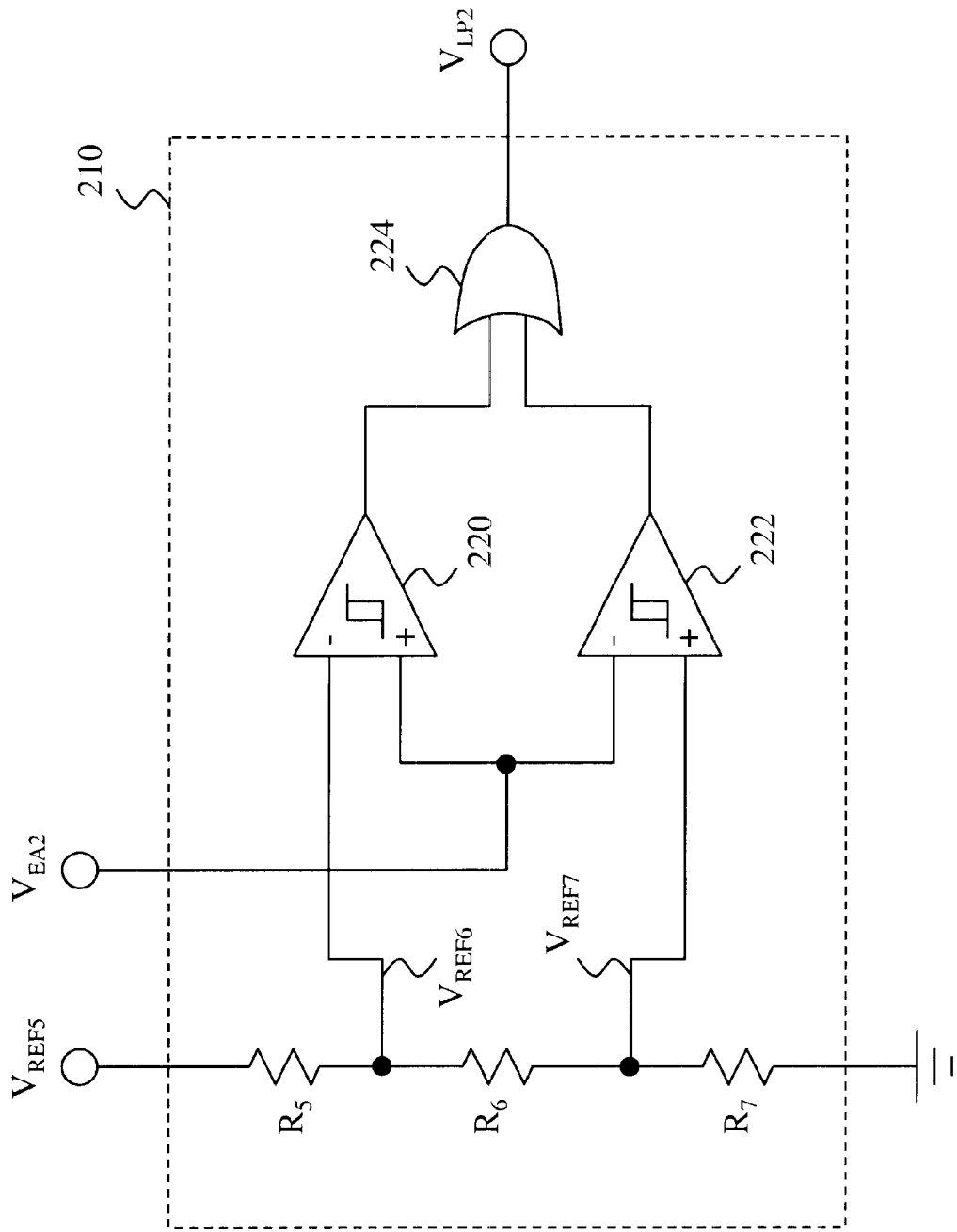
FIG. 8 illustrates a schematic diagram of a low power detection circuit for the power amplifier of FIG. 7.

FIG. 8 illustrates a schematic diagram of the low power detector 210 of FIG. 7. Referring to FIG. 8, a reference voltage $V_{REF5}$ may be coupled to a first terminal of a resistor $R_5$. A reference voltage $V_{REF6}$ is formed at a second terminal of the resistor $R_5$ and may be coupled to a first terminal of a resistor $R_6$ and to a first terminal of a comparator 220. A reference voltage $V_{REF7}$ is formed at a second terminal of the resistor $R_6$ and may be coupled to a first terminal of a resistor $R_7$ and to a first terminal of a comparator 222. A second terminal of the resistor $R_7$ may be coupled to the ground node. The error signal $V_{EA2}$ may be coupled to a second input of the comparator 220 and to a second input of the comparator 222. An output of the comparator 220 may be coupled to a first input of a logic OR gate 224, while an output of the comparator 222 may be coupled to a second input of the logic OR gate 224. An output of the logic OR gate 224 forms the signal $V_{LP2}$.

Together, the comparators 220 and 222 and the logic OR gate 224 form a window comparator such that the output $V_{LP2}$ is a logic high voltage, and the transistors $M_6$ and $M_8$ (FIG. 7) are enabled, only when its input signal $V_{EA2}$ is higher than $V_{REF6}$ or lower than $V_{REF7}$. When the error signal $V_{EA2}$ is between the levels of $V_{REF6}$ and $V_{REF7}$, then a low power condition is indicated in which the output signal $V_{LP2}$ is a logic low voltage and the transistor switches $M_6$ and $M_8$ are disabled from switching. The levels of $V_{REF6}$ and $V_{REF7}$ can be selected to adjust the thresholds at which the low power detector 210 indicates a low power condition. A window comparison is preferred over a single threshold comparison because the audio input signal $AUD_{IN}$ is expected to be an alternating current (AC) signal with positive and negative swings. Thus, the upper threshold $V_{REF6}$ of the window comparator detects positive swings in the audio input signal $AUD_{IN}$ and the lower threshold $V_{REF7}$ detects negative swings. In the preferred embodiment, the comparators 220 and 222 each have a hysteretic transfer characteristic so as to avoid enabling and disabling the transistor switches $M_6$ and $M_8$ excessively should the input signal $V_{EA2}$ hover about one of the threshold voltages $V_{REF6}$ or $V_{REF7}$.

It will be apparent that appropriate modifications to the logic circuitry of FIG. 7 may be made to disable transistor pair $M_5$ and $M_6$ from switching, if desired, when the transistor pair $M_6$ and $M_8$ are actively switching. Thus, only one of the pairs of transistor switches may be actively switching at a time. It will also be apparent that the power amplifier 200 may be provided with additional pairs of transistor switches which may be selectively enabled and disabled according to the level of the input signal $AUD_{IN}$ or the error signal $V_{EA2}$.

Figure 9A:
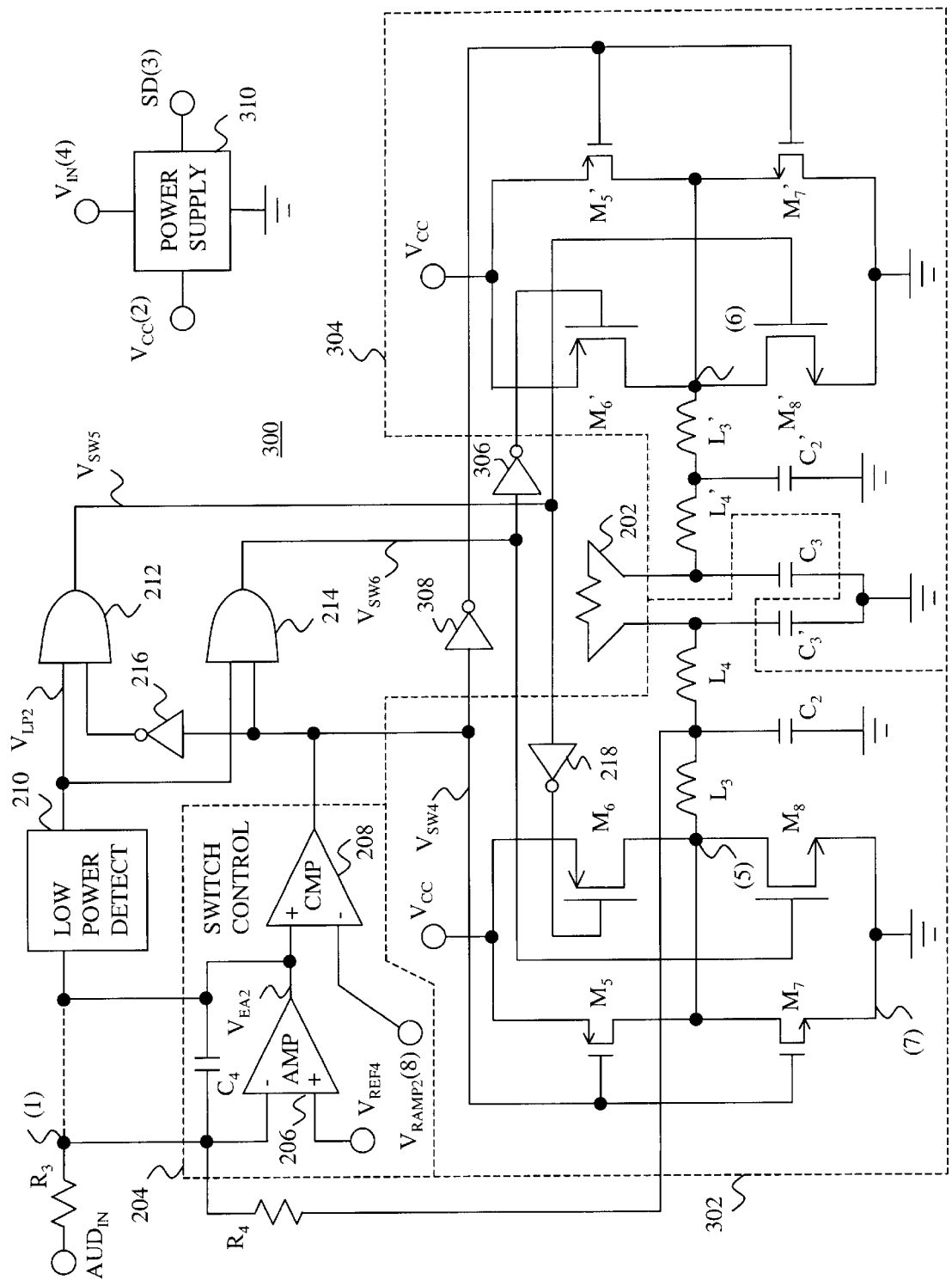
FIGS. 9A–B illustrate a schematic diagram of a class D switching power amplifier having a feedback arrangement and low power mode.
Figure 9B:
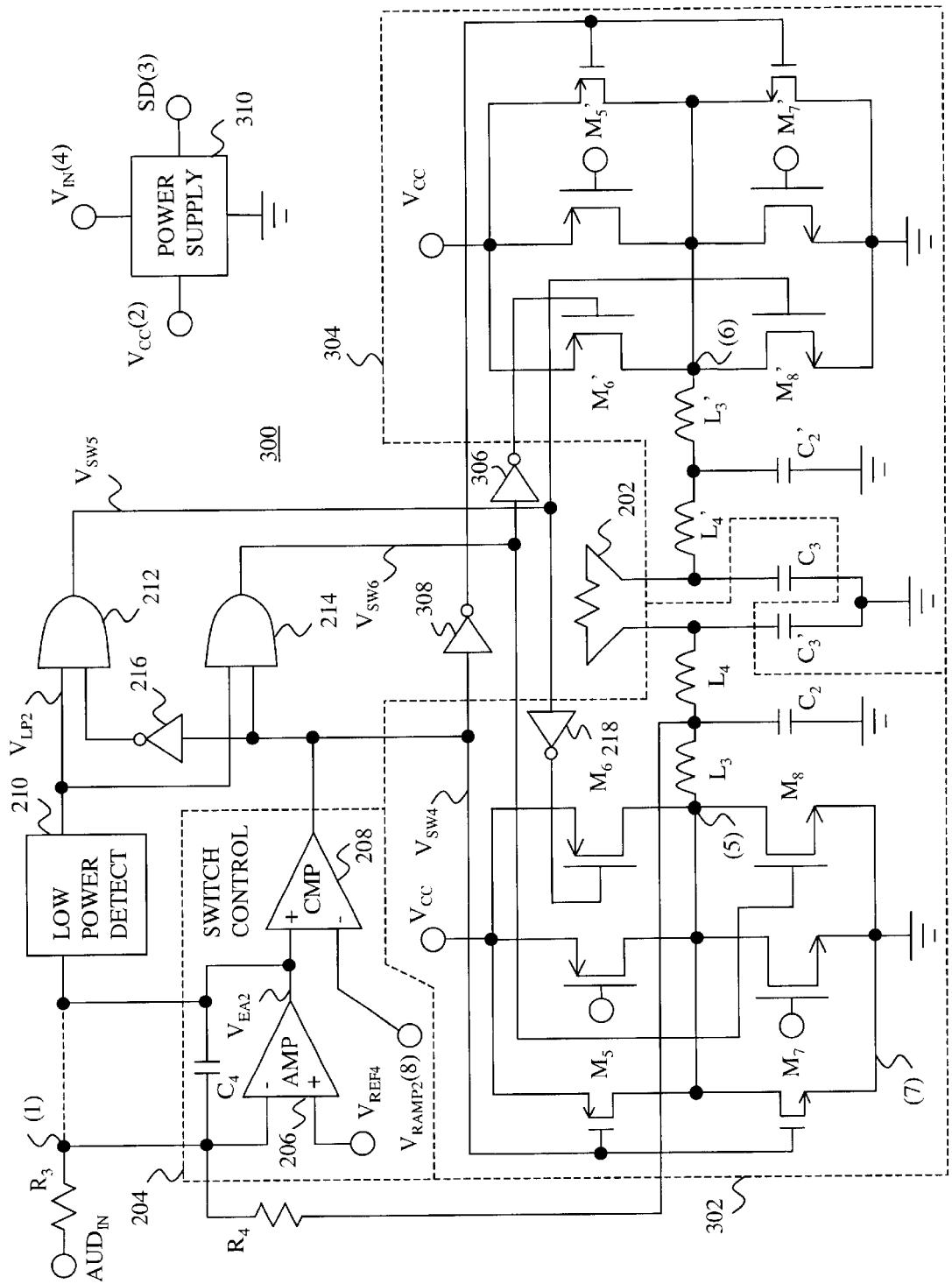

FIG. 9A illustrates a schematic diagram of a class D switching power amplifier 300 having a feedback arrangement and low power mode in accordance with the present invention. The power amplifier 300 of FIG. 9A is similar to the power amplifier 200 illustrated in FIG. 7 with important differences discussed below. Elements of FIG. 9A having a one-to-one functional correspondence with those of FIG. 7 are given the same reference numeral. An important difference between the amplifier 200 (FIG. 7) and the amplifier 300 (FIG. 9A) is that the amplifier 300 includes a second switching stage 304 in addition to a first switching stage 302. Elements of the second switching stage 304 having a one-to-one functional correspondence with elements of the first switching stage 302 are given the same reference numerals primed.

The pair of transistor switches $M_6'$ and $M_8'$ of the second switching stage 304 may be disabled from switching when the transistor switch pair $M_6$ and $M_8$ of the first stage 302 are disabled from switching. This is apparent from FIG. 9A because when the low power detection signal $V_{LP2}$ is logic low voltage, the signal levels applied to the gates of the transistors $M_6'$ and $M_8'$ will cause these transistor switches to be off (open). For example, the switch control signal $V_{SW4}$ is a logic low voltage and is applied to the transistor $M_8$. In addition, the switch control signal $V_{SW5}$ is a logic low voltage which is inverted by the inverter 306 and applied to the transistor $M_6'$. However, when low power detection signal $V_{LP2}$ is a logic high voltage, the transistor switches $M_6'$ and $M_8'$ are actively switching, the transistor $M_6'$ is in the same condition (opened or closed) as the transistor $M_8$. This is apparent from FIG. 9A. Similarly, when actively switching, the transistor $M_8'$ is in the same condition (opened or closed) as the transistor $M_6$. This is also apparent from FIG. 9A. In addition, it can be seen from FIG. 9A that the transistor switches $M_5$ and $M_7$ receive the switch control signal $V_{SW4}$, while the transistor switches $M_5'$ and $M_7'$ receive the switch control signal $V_{SW4}$, after being inverted by inverter 306.

Thus, by providing the second switching stage 304, the switching power amplifier 300 includes an H-bridge arrangement of transistor switches for driving a load, such as the speaker 202, with a differential output signal. This is in contrast to the switching power amplifier 200 of FIG. 7 in which the speaker 202 is driven with a single-ended output signal.

In contrast to a conventional class D audio amplifier, the amplifier 300 illustrated in FIG. 9A provides a negative feedback signal from the first switching stage 302 to the switch controller 204 via the resistor $R_4$. More particularly, the resistor $R_4$ may be coupled between the first terminal of the resistor $R_3$ and the second terminal of the inductor $L_3$. Although feedback is preferably not provided from the second switching stage 304, the output of the second stage 304 is expected to be limited by the feedback signal from the first stage 302 since the two stages 302 and 304 are expected to have comparable behavior. This is because the transistor switches $M_5$–$M_8$ and $M_5'$–$M_8'$ may be formed monolithically (i.e., the transistor switches $M_5$–$M_8$ and $M_5'$–$M_8'$ may all be formed on one integrated circuit chip). Accordingly, the amplifier 300 of FIG. 7 provides a differential output audio signal across the speaker 202 which is controlled with feedback to closely follow the input audio signal $AUD_{IN}$. It will be apparent that this feedback feature of the present invention may be implemented in a switching amplifier, as described in reference to FIG. 9A, even assuming the selectively disabled transistor switches $M_6$, $M_6'$, $M_8$ and $M_8$ are omitted. By providing such feedback, the amplifier 300 is less susceptible to distortion than a conventional class D amplifier operated in open loop.

In addition, the amplifier 300 of FIG. 9A provides a low power mode at times when the input audio signal $AUD_{IN}$ is of relatively low amplitude. More particularly, when the low power detector 210 of FIG. 9A detects that the audio input signal $AUD_{IN}$ is at a relatively low level, the low power detector 210 provides a logic low voltage to the logic AND gates 212 and 214. In response, the transistor switches $M_6$, $M_6'$, $M_8$, and $M_8'$ are disabled from switching. Under these conditions, only the transistors $M_5$, $M_5'$, $M_7$ and $M_7$ may be actively switching so as to provide power to the speaker 202. Alternately, with appropriate modifications to the logic circuitry of FIG. 7, the transistor switches $M_5$, $M_5'$, $M_7$ and $M_7'$ may be disabled from switching when the transistor switches $M_6$, $M_6'$, $M_8$ and $M_8'$ are actively switching.

Further, the amplifier 300 of FIG. 9A may be implemented as an integrated circuit chip package having eight pins, as shown in FIG. 9A. A pin (1) may be coupled to a node between the resistors $R_3$ and $R_4$; a second pin (2) may be coupled as an output of a power supply 310 for providing a regulated voltage $V_{CC}$ to circuitry of the amplifier 300; a third pin (3) may be coupled as an input to the power supply 310 for selectively shutting down the amplifier 300; a fourth pin (4) may be coupled as in input to the power supply 310 for providing an unregulated voltage to the power supply; a fifth pin (5) may be coupled to an output of the first switching stage 302 (e.g., to a first terminal of the inductor $L_3$); a sixth pin (6) may be coupled to an output of the second switch stage 304 (e.g., to a first terminal of the inductor $L_3'$); a seventh pin (7) may be coupled to a ground node of the amplifier 300; and an eighth pin (8) may be coupled to provide the ramp signal $V_{RAMP2}$ to the switch controller 204.

While the foregoing has been with reference to particular embodiments of the invention, it will be appreciated by those skilled in the art that changes in these embodiments may be made without departing from the principles and spirit of the invention, the scope of which is defined by the appended claims. For example, it will be apparent that the equivalent logic functions can be implemented using circuitry other than that illustrated herein. Further, it will be apparent that signals which are disclosed herein as active high can be made active low and that signals that are disclosed as active low can be made active high. Similarly, gate drive signals for the various transistors may be formed by additional circuitry, such as buffers or charge pumps. Further, the transistors disclosed herein may be replaced by another type of transistor with appropriate modifications. Accordingly, n-type and p-type transistors may be exchanged for the other or for a npn or pnp bipolar transistor.

What is claimed is:

1. A switching amplifier for receiving an input signal and for generating a differential output signal representative of the input signal comprising:

a first pair of transistor switches for alternately raising and lowering a voltage potential of a first terminal of a first reactive element upon switching of the first pair of transistor switches;

a second pair of transistor switches for alternately raising and lowering a voltage potential of the first terminal of the first reactive element upon switching of the second pair of transistor switches;

a third pair of transistor switches for alternately raising and lowering a voltage potential of a first terminal of a second reactive element upon switching of the third pair of transistor switches;

a fourth pair of transistor switches for alternately raising and lowering a voltage potential of the first terminal of the second reactive element upon switching of the fourth pair of transistor switches;

a switch controller for controlling switching of the first, second, third and fourth pairs of transistor switches in accordance with the input signal for forming the differential output signal across a second terminal of the first reactive element and a second terminal of the second reactive element; and a low signal level detector coupled to the second and fourth pair of transistor switches for disabling the second and fourth pair of transistor switches from switching upon detection of a low input signal level condition.

2. The switching amplifier according to claim 1, wherein the input signal is an audio signal.

3. The switching amplifier according to claim 1, further comprising a speaker coupled to receive the differential output signal.

4. The switching amplifier according to claim 1, further comprising one or more additional pairs of transistor switches for alternately raising and lowering a voltage potential of the first terminal of the reactive element, and one or more additional pairs of transistor switches for alternately raising and lowering a voltage potential of the first terminal of the second reactive element, each additional pair being selectively disabled by the low signal level detector upon detection of a corresponding low input signal level condition.

5. The switching amplifier according to claim 1, wherein the transistor switches of the first pair have substantially equal current carrying capacities which are substantially different from current carrying capacities of the transistor switches of the second pair.

6. The switching amplifier according to claim 1, wherein the low signal level detector detects the low input signal level condition by monitoring the input signal.

7. The switching amplifier according to claim 1, wherein the low signal level detector detects the low input signal level condition by monitoring an error signal representative of a difference between the input signal and a reference level.

8. The switching amplifier according to claim 1, wherein the low signal level detector comprises a window comparator.

9. The switching amplifier according to claim 8, wherein the window comparator has a hysteretic transfer characteristic.

10. The switching amplifier according to claim 1, further comprising a feedback path from a terminal of the first reactive element to the switch controller for limiting the differential output signal.

11. The switching amplifier according to claim 10, wherein no corresponding feedback path is present from the second reactive element to the switch controller.

12. The switching amplifier according to claim 1, wherein the first and third pairs of transistor switches are actively switching when the low input signal level condition is not detected.

13. The switching amplifier according to claim 1, wherein the first and third pairs of transistor switches are disabled by the low signal level detector when the low input signal level condition is not detected.

14. The switching amplifier according to claim 1, being implemented in an eight pin integrated circuit package.

15. A switching amplifier for receiving an input signal and for generating a differential output signal representative of the input signal comprising:

a first pair of transistor switches for alternately raising and lowering a voltage potential of a first terminal of a first reactive element upon switching of the first pair of transistor switches;

a second pair of transistor switches for alternately raising and lowering a voltage potential of a first terminal of a second reactive element upon switching of the second pair of transistor switches;

a switch controller for controlling switching of the first and second pairs of transistor switches in accordance with the input signal for forming the differential output signal across a second terminal of the first reactive element and a second terminal of the second reactive element; and a feedback path from a terminal of the first reactive element to the switch controller for limiting the differential output signal.

16. The switching amplifier according to claim 15, wherein no corresponding feedback path is present from the second reactive element to the switch controller.

* * * * *